US008590391B2

(12) United States Patent
Speith et al.

(10) Patent No.: US 8,590,391 B2
(45) Date of Patent: Nov. 26, 2013

(54) METHOD FOR MONITORING A GRINDING SYSTEM AND GRINDING SYSTEM COMPRISING A MONITORING DEVICE

(75) Inventors: Christian Speith, Wadersloh (DE); Markus Berger, Enningerloh (DE); Franz-Josef Zurhove, Waldshut-Tiengen (DE); Rüdiger Ostkamp, Warendorf (DE); Gisela Ostkamp, legal representative, Warendorf (DE); Ludger Kimmeyer, Beckum (DE); Matthias Wuwer, Lippetal (DE); Pedro Guerrero Palma, Lippetal (DE)

(73) Assignee: Polysius AG, Beckum (DE)

( * ) Notice: Subject to any disclaimer, the term of this patent is extended or adjusted under 35 U.S.C. 154(b) by 222 days.

(21) Appl. No.: 13/056,753

(22) PCT Filed: Aug. 31, 2009

(86) PCT No.: PCT/EP2009/061213

§ 371 (c)(1), (2), (4) Date: Jan. 31, 2011

(87) PCT Pub. No.: WO2010/028970

PCT Pub. Date: Mar. 18, 2010

(65) Prior Publication Data

US 2011/0126641 A1 Jun. 2, 2011

(30) Foreign Application Priority Data

Sep. 12, 2008 (DE) ......................... 10 2008 046 921

(51) Int. Cl.
*G01N 3/00* (2006.01)

(52) U.S. Cl.
USPC ............................................................ 73/788

(58) Field of Classification Search
USPC ............................................................ 73/778
See application file for complete search history.

(56) References Cited

U.S. PATENT DOCUMENTS

| | | | | | |
|---|---|---|---|---|---|
| 4,063,906 | A | * | 12/1977 | Wetzels | 451/49 |
| 4,112,625 | A | * | 9/1978 | Wetzels | 451/123 |
| 4,663,892 | A | * | 5/1987 | Smith | 451/49 |
| 4,910,985 | A | * | 3/1990 | Ballyns | 72/10.4 |
| 5,114,082 | A | * | 5/1992 | Brundiek | 241/121 |
| 5,203,188 | A | * | 4/1993 | Osgood et al. | 72/9.4 |
| 5,519,298 | A | | 5/1996 | Fukuhara | |
| 5,616,068 | A | * | 4/1997 | Soderberg | 451/49 |
| 5,702,060 | A | * | 12/1997 | Matteazzi et al. | 241/175 |

FOREIGN PATENT DOCUMENTS

| | | |
|---|---|---|
| JP | 02122848 A1 | 5/1990 |

* cited by examiner

*Primary Examiner* — Lisa Caputo
*Assistant Examiner* — Octavia Davis-Hollington
(74) *Attorney, Agent, or Firm* — Renner Kenner Greive Bobak Taylor & Weber

(57) ABSTRACT

The invention relates to a method for monitoring the load state of a grinding system having rotating grinding elements, the dynamic forces exerted by the grinding stock on the grinding elements being detected in a first frequency range which contains the fundamental oscillation of the grinding elements, and in a second frequency range in which the first harmonic of the fundamental oscillation occurs, and measures for reducing the load state being introduced when the first harmonic exceeds a predetermined threshold value in relation to the magnitude of the fundamental oscillation. Such a method permits very reliable and accurate monitoring of the load state of the grinding system.

13 Claims, 2 Drawing Sheets

METHOD FOR MONITORING A GRINDING SYSTEM AND GRINDING SYSTEM COMPRISING A MONITORING DEVICE

TECHNICAL FIELD

The invention relates to a method for monitoring the load state of a grinding system and to a grinding system equipped with such a monitoring device.

BACKGROUND OF THE INVENTION

In order to monitor grinding systems, for example roller mills, it is known to detect the vibration rate of the individual grinding elements and of the entire grinding system by means of sensors and to monitor with respect to predetermined limiting values the effective value of the vibration rate in the frequency range of from 10 to 1000 Hz in accordance with ISO 10816-3, the so-called RMS value (Root-Mean-Square), in the control arrangement of the grinding system.

Investigations and measurements carried out have shown, however, that that known vibration monitoring by means of the RMS value is not entirely reliable since, on the one hand, it sometimes detects critical load states too late or not at all while, on the other hand, it occasionally responds even though a critical load state has not yet been reached.

In order to protect mills against overloading it is also known to pick up electro-acoustically the operating noise generated by the mill and to evaluate the electrical signals so obtained according to frequency and/or intensity (DE 36 21 400 A1). However, nor does that method meet the demands with respect to reliability and sensitivity made on the monitoring of large grinding systems.

SUMMARY OF THE INVENTION

The object of the invention is therefore to provide a method and a grinding system which permit an especially reliable and accurate monitoring of the load state of the grinding system.

That object is achieved according to the invention by the features of claims 1 and 11, respectively.

Advantageous forms of the invention are the subject-matter of the subordinate claims.

In the tests on which the invention is based, it was surprisingly established that the first harmonic of the fundamental oscillation of the dynamic forces exerted by the grinding stock on the grinding element is an especially suitable operating parameter for monitoring the load state of the grinding system. For, while the frequency and the magnitude of the fundamental oscillation of the forces exerted on the grinding element are basically determined by the structure of the mill and do not always change significantly even if the load is increased, the magnitude of the first harmonic (that is to say, the first upper harmonic wave) of that fundamental oscillation is found to be an extraordinarily sensitive indicator of a greatly increased or even critical load state. This holds good especially when the magnitude of the first harmonic is placed in relation to the magnitude of the fundamental oscillation.

It is therefore expedient to detect the forces acting on the grinding element in two frequency ranges, namely in a first frequency range which contains the fundamental oscillation of the forces, and in a second frequency range in which the first harmonic of that fundamental oscillation occurs.

Measures for reducing the load state of the grinding system are introduced especially when the first harmonic exceeds a predetermined value in relation to the magnitude of the fundamental oscillation.

In the case of a roller mill, the first frequency range is advantageously from 10 to 30 Hz, preferably from 15 to 25 Hz, and the second frequency range is advantageously from 20 to 60 Hz, preferably from 30 to 50 Hz.

When grinding elements that are driven at an adjustable speed are used, it is possible, according to an advantageous development of the invention, in addition to monitoring the dynamic forces exerted by the grinding stock on the grinding elements, to determine the driving torque from the power and the speed and to alter the load state of the grinding system by changing the speed of the grinding elements.

BRIEF DESCRIPTION OF THE DRAWINGS

An embodiment of the invention is illustrated diagrammatically in the drawings in which.

DETAILED DESCRIPTION OF THE INVENTION

Figure 1:
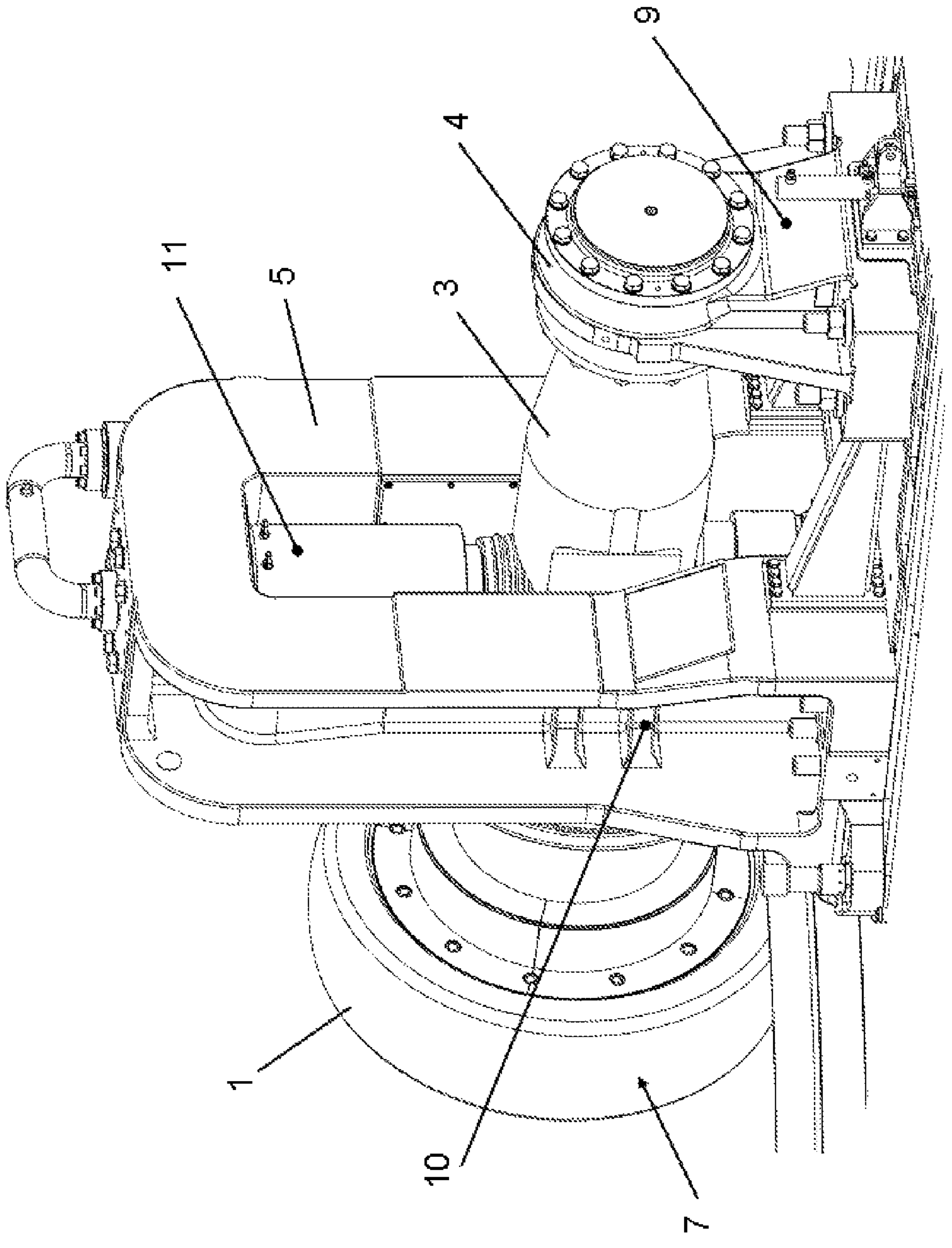
FIG. 1 is a perspective view of one of several grinding rollers of a roller mill with the associated roller bearing.
Figure 2:
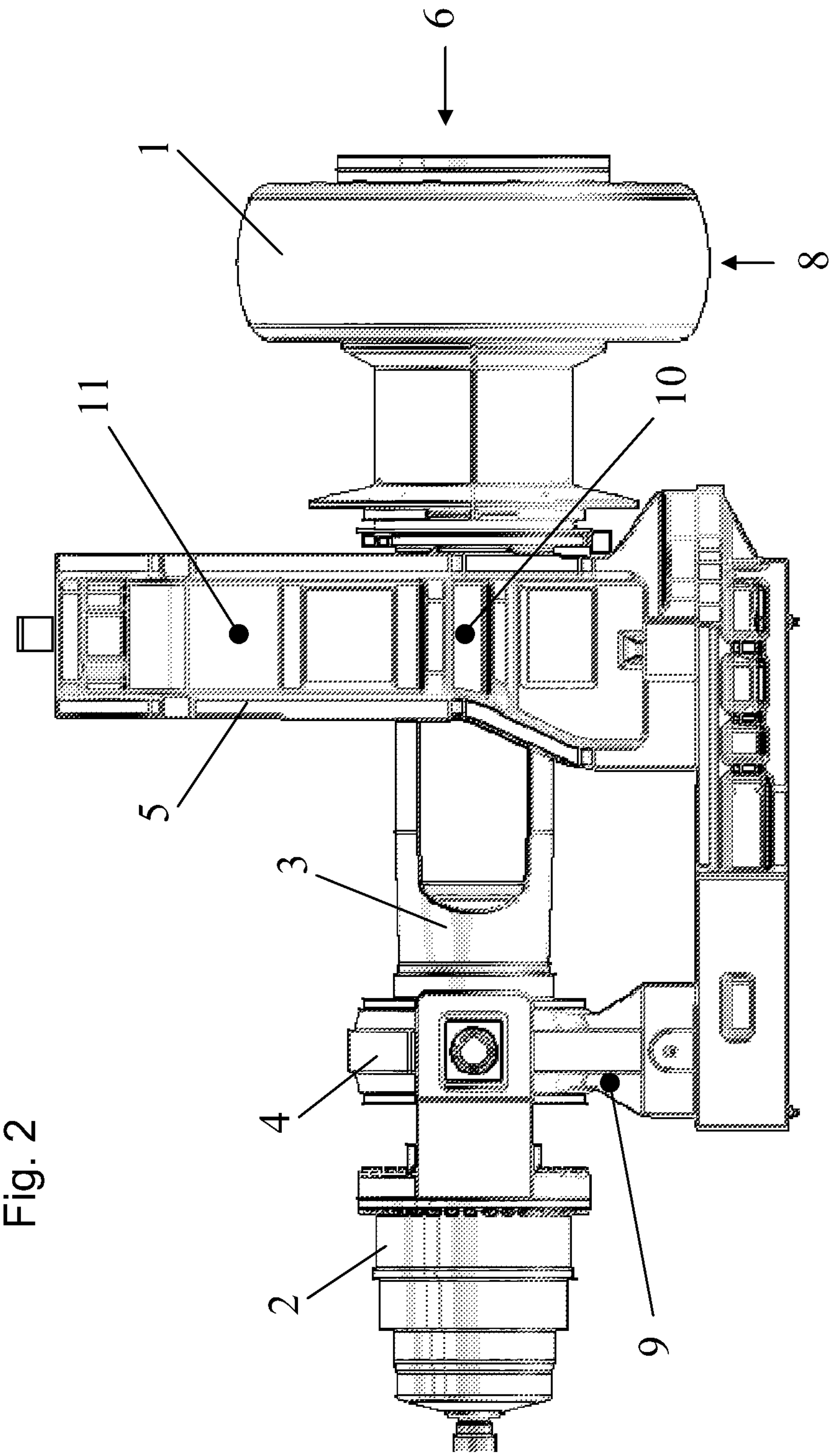
FIG. 2 is a side view of the grinding roller according to FIG. 1.

The grinding roller 1 runs on the grinding table (not shown) of a vertical roller mill and can be driven either directly—as in the embodiment shown—by a drive motor 2 by way of a shaft surrounded by an arbor 3, or indirectly by way of the grinding table.

On the side facing the drive motor 2, the shaft is arranged in a stationary bearing 4 and, on the side facing the grinding roller 1, it is arranged in a movable bearing 5 constructed as a force frame.

In operation, dynamic forces are exerted by the grinding stock on the grinding roller 1 in the axial direction (arrow 6), the tangential direction (arrow 7) and the vertical direction (arrow 8).

The forces acting in the axial direction are detected in the stationary bearing 4 by an extension measurement sensor 9 fitted there.

The forces acting in the tangential direction are ascertained in the movable bearing 5 by an extension measurement sensor 10 provided there.

The forces acting in the vertical direction are ascertained in the movable bearing 5 by means of the pressure of a hydraulic system 11 supporting the arbor 3 in the force frame of the movable bearing 5.

In operation, the dynamic forces exerted by the grinding stock on the grinding roller 1 are monitored by measuring the extensions by means of the sensors 9 and 10 and by measuring the pressure in the hydraulic system 11 in the frequency ranges of from 15 to 25 Hz (in accordance with the fundamental oscillation of the dynamic forces) and from 30 to 50 Hz (in accordance with the first harmonic of the dynamic forces) at all of the roller units of the vertical roller mill.

If a level which is at least from three to five times greater than the average level existing in normal operation occurs at least two of the three measuring sites of a roller unit in at least one of the two frequency ranges, this indicates that a critical load state is being approached. In that case, suitable measures for reducing the load state are introduced automatically.

The invention claimed is:

1. Method for monitoring a load state of a grinding system having rotating grinding elements, at least one load-specific operating parameter being detected and, if a threshold value is exceeded, measures being introduced to reduce the load state, characterized by the steps of a) detecting a dynamic force exerted by a grinding stock on at least one grinding element in at least one direction in a first frequency range that contains a fundamental oscillation of the grinding element, b) detecting the dynamic force exerted by the grinding stock on at least one grinding element in a second frequency range in which a first harmonic of the fundamental oscillation occurs, and c) introducing measures for reducing the load state when the first harmonic exceeds a predetermined threshold value in relation to the magnitude of the fundamental oscillation.

2. Method according to claim 1 wherein the grinding system includes a roller mill having grinding elements running on a grinding table, characterised in that the dynamic force exerted by the grinding stock on the grinding elements in the axial direction is detected.

3. Method according to claim 2 wherein the grinding system includes a roller mill having grinding elements running on a grinding table, characterised in that the dynamic force exerted by the grinding stock on the grinding elements in the tangential direction is detected.

4. Method according to claim 3 wherein the grinding system includes a roller mill having grinding elements running on a grinding table, characterised in that the dynamic force exerted by the grinding stock on the grinding elements in the vertical direction is detected.

5. Method according to claim 4, using grinding elements arranged in a stationary bearing and in a movable bearing, characterised in that the dynamic force exerted by the grinding stock on the grinding elements in the axial direction is detected by means of an extension measurement in the stationary bearing, the dynamic force exerted by the grinding stock on the grinding elements in the tangential direction is detected by an extension measurement in the stationary bearing and the dynamic force exerted by the grinding stock in the vertical direction is detected by a pressure measurement in the stationary bearing.

6. Method according to claim 5, characterised in that measures for reducing the load state are introduced when the level of at least two of the three measuring sites is at least from three to five times greater than the average level existing in normal operation in one of the first frequency range and the second frequency range.

7. Method according to claim 1, characterised in that the dynamic force exerted by the grinding stock on a grinding element is detected in a first frequency range of from 10 to 30 Hz—and in a second frequency range of from 20 to 60 Hz.

8. Method according to claim 1, using grinding elements driven at an adjustable speed, characterised in that, in addition to monitoring the dynamic forces exerted by the grinding stock on the grinding elements, the driving torque is determined from the power and the speed, and the load state of the grinding system is altered by changing the speed.

9. Method according to claim 1, using grinding elements rolling on a grinding table, characterised in that the grinding elements are driven directly.

10. Method according to claim 1, using grinding elements rolling on a grinding table, characterised in that the grinding elements are driven by means of the grinding table.

11. Method according to claim 1, characterised in that the dynamic force exerted by the grinding stock on a grinding element is detected in a first frequency range of from 15 to 25 Hz.

12. Method according to claim 11, characterised in that the dynamic force exerted by the grinding stock on a grinding element is detected in a second frequency range of from 30 to 50 Hz.

13. Grinding system having driven grinding elements and a device for monitoring the load state of the grinding system, containing at least one sensor for detecting a load-specific operating parameter of the grinding system, and means for reducing the load state of the grinding system if a threshold value of the detected operating parameter is exceeded, characterised by a sensor for detecting the dynamic force exerted by the grinding stock on at least one grinding element in a first frequency range which that contains the fundamental oscillation of the grinding element, and in a second frequency range in which the first harmonic of the fundamental oscillation of the grinding element occurs.

* * * * *